United States Patent
Bouyahyi et al.

(10) Patent No.: US 11,472,900 B2
(45) Date of Patent: *Oct. 18, 2022

(54) PROCESS FOR PREPARATION OF ETHYLENE AND PROPYLENE IONOMER

(71) Applicant: SABIC GLOBAL TECHNOLOGIES B.V., Bergen op Zoom (NL)

(72) Inventors: Miloud Bouyahyi, Eindhoven (NL); Lidia Jasinska-Walc, Eindhoven (NL); Robbert Duchateau, Roostenlaan (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 157 days.

This patent is subject to a terminal disclaimer.

(21) Appl. No.: 16/954,364

(22) PCT Filed: Dec. 24, 2018

(86) PCT No.: PCT/EP2018/086848
§ 371 (c)(1),
(2) Date: Jun. 16, 2020

(87) PCT Pub. No.: WO2019/122457
PCT Pub. Date: Jun. 27, 2019

(65) Prior Publication Data
US 2021/0087312 A1 Mar. 25, 2021

(30) Foreign Application Priority Data

Dec. 22, 2017 (EP) .................................... 17210400
Dec. 22, 2017 (EP) .................................... 17210412
Dec. 22, 2017 (EP) .................................... 17210434
Dec. 22, 2017 (EP) .................................... 17210447
Dec. 22, 2017 (EP) .................................... 17210485
Dec. 22, 2017 (EP) .................................... 17210534

(51) Int. Cl.
*C08F 210/16* (2006.01)
*C08F 220/04* (2006.01)
*C08F 210/06* (2006.01)
*C08F 8/42* (2006.01)
*C08F 8/44* (2006.01)
*C08F 210/14* (2006.01)
*C08F 2/06* (2006.01)
*C08F 4/659* (2006.01)
*C08F 4/6592* (2006.01)
*C08F 8/12* (2006.01)
*C08F 220/64* (2006.01)

(52) U.S. Cl.
CPC .............. *C08F 210/06* (2013.01); *C08F 2/06* (2013.01); *C08F 4/65912* (2013.01); *C08F 4/65927* (2013.01); *C08F 8/12* (2013.01); *C08F 8/42* (2013.01); *C08F 8/44* (2013.01); *C08F 210/14* (2013.01); *C08F 210/16* (2013.01); *C08F 220/04* (2013.01); *C08F 220/64* (2013.01); *C08F 2410/01* (2013.01); *C08F 2410/07* (2021.01); *C08F 2420/00* (2013.01); *C08F 2420/02* (2013.01); *C08F 2800/10* (2013.01); *C08F 2810/20* (2013.01); *C08F 2810/50* (2013.01)

(58) Field of Classification Search
CPC .... C08F 210/16; C08F 210/02; C08F 210/06; C08F 220/02; C08F 220/04; C08F 220/62; C08F 220/64; C08F 8/44; C08F 8/30; C08F 8/32
See application file for complete search history.

(56) References Cited

U.S. PATENT DOCUMENTS

| | | | | |
|---|---|---|---|---|
| 3,864,268 A * | 2/1975 | Culbertson | ............... | C08F 8/32 508/316 |
| 4,017,669 A | 4/1977 | Collette et al. | | |
| 5,646,332 A * | 7/1997 | Cusumano | ............... | C07C 51/14 560/204 |
| 6,342,622 B1 | 1/2002 | Arts et al. | | |
| 7,393,907 B2 * | 7/2008 | Imuta | ..................... | C08L 53/00 526/281 |
| 10,472,447 B2 * | 11/2019 | Jasinska-Walc | ........ | C08G 63/08 |
| 2002/0156207 A1 | 10/2002 | Imuta et al. | | |
| 2013/0059990 A1 | 3/2013 | Kaji et al. | | |
| 2014/0275433 A1* | 9/2014 | Ng | ............................ | C08F 8/04 525/333.7 |
| 2021/0087304 A1 | 3/2021 | Bouyahyi et al. | | |
| 2021/0087310 A1 | 3/2021 | Jasinska-Walc et al. | | |
| 2021/0087312 A1* | 3/2021 | Bouyahyi | ................ | C08F 2/06 |
| 2021/0087313 A1* | 3/2021 | Bouyahyi | ........... | C08F 4/65912 |
| 2021/0309775 A1 | 10/2021 | Jasinska-Walc et al. | | |
| 2021/0363278 A1 | 11/2021 | Jasinska-Walc et al. | | |

FOREIGN PATENT DOCUMENTS

| | | |
|---|---|---|
| CN | 104693327 A | 6/2015 |
| DE | 102014113894 A1 | 4/2015 |
| EP | 0295076 A1 | 12/1988 |
| EP | 1186619 A2 | 3/2002 |

(Continued)

OTHER PUBLICATIONS

Baier et al., "Post-Metallocenes in the Industrial Production of Polyolefins" Angew. Chem. Int. Ed. 2014, 53, 9722-9744.
Delferro et al., "Multinuclear Olefin Polymerization Catalysts", Chem. Rev. 2011, 111, 2450-2485.
Fernandes S et al. "Copolymerization of ethylene/unsaturated alcohols using nickel catalysts: effect of the ligand on the activity and comonomer incorporation", Journal of Organometallic Chemistry, Elsevier-Sequoia S.A. Lausanne, CH, vol. 690, No. 4, Feb. 14, 2005.

(Continued)

*Primary Examiner* — Rip A Lee
(74) *Attorney, Agent, or Firm* — Cantor Colburn LLP

(57) ABSTRACT

The present invention relates to an ethylene and propylene ionomer and a process for the preparation of an ethylene and propylene ionomer.

18 Claims, No Drawings

(56) References Cited

FOREIGN PATENT DOCUMENTS

| | | | |
|---|---|---|---|
| EP | 3034544 A1 | 6/2016 | |
| EP | 3034545 A1 | 6/2016 | |
| JP | 2007262338 A | 10/2007 | |
| WO | 9319104 A1 | 9/1993 | |
| WO | 9411406 A1 | 5/1994 | |
| WO | 9613529 A1 | 5/1996 | |
| WO | 9742236 A1 | 11/1997 | |
| WO | WO 2009/123228 A1 * | 10/2009 | ............. C08L 23/00 |
| WO | 2016102690 A1 | 6/2016 | |
| WO | 2017090585 A1 | 6/2017 | |
| WO | 2017118617 A1 | 7/2017 | |
| WO | 2019122453 A1 | 6/2019 | |
| WO | 2019122455 A1 | 6/2019 | |
| WO | 2019122456 A1 | 6/2019 | |
| WO | 2019122458 A1 | 6/2019 | |
| WO | 2019122459 A1 | 6/2019 | |

OTHER PUBLICATIONS

Ferreira M. L. et al: "Effect of Co- and Non-copolymerization Lewis Bases in Propylene Polymerization WIT ETIND2ZRCL2/MAO" Molecular Chemistry and Physics, Wiley-VCH Verlag, Weinheim, DE, vol. 2020, No. 6, Apr. 18, 2001, pp. 830-839.

Gibson et al. "Advances in Non-Metallocene Olefin Polymerization Catalysis" Chem. Rev. 2003, 103, 283-315.

Ito Shingo et al: "Coordination-Insertion Copolymerization of Allyl Monomers with Ethylene", Journal of the American Chemical Society, American Chemical Society, US, vol. 133, No. 5, Jan. 1, 2011, pp. 1232-1235.

Makio et al., "FI Catalysts for Olefin Polymerization—A Comprehensive Treatment" Chem. Rev. 2011, 111, 2363-2449.

Maria M. Marques et al. "Polymerization with TMA-protected polar vinyl comonomers. I. Catalyzed by group 4 metal complexes with hapto-5-type ligands", Journal of Polymer Science, Part A: Polymer Chemistry, vol. 2. 14, Jul. 15, 1999, pp. 2457-2469.

Mu et al.," Neutral Nickel Catalysts for Olefin Homo- and Copolymerization: Relationships between Catalyst Structures and Catalytic Properties" Chem. Rev. 2015, 115, pp. 12091-12137.

Severn et al. ""Bound but Not Gagged"—Immobilizing Single-Site a-Olefin Polymerization Catalysts" Chem. Rev. 2005, 105, 4073-4147.

T. J. Marks et al. "Cocatalysts for Metal-Catalyzed Olefin Polymerization: Activators, Activation Processes, and Structure-Activity Relationships", Chem. Rev. 2000, 100, 1391-1434.

Van der mee et al.: "Thermoreverisble cross-linking of maleated ethylene/propylene copolymers with diamines and aminoalcohols", Polymer, vol. 49, No. 5, Jan. 20, 2008, pp. 1239-1248.

Zhentian Yu et al. "Olefin terpolymerizations. I. 1, 4-hexadiene", Journal of Polymer Science, Part A: Polymer Chemistry, vol. 33, No. 6, Apr. 30, 1995, pp. 979-987.

Boffa, Lisa S. and Novak, Bruce M., "Copolymerization of Polar Monomers with Olefins Using Transition-Metal Complexes", Chem. Rev. 2000, 100, 1479-1493.

International Search Report for International Application No. PCT/EP2018/086848, International Filing Date Dec. 24, 2018, dated Mar. 15, 2019, 6 pages.

Written Opinion for International Application No. PCT/EP2018/086848, International Filing Date Dec. 24, 2018, dated Mar. 15, 2019, 5 pages.

* cited by examiner

PROCESS FOR PREPARATION OF ETHYLENE AND PROPYLENE IONOMER

CROSS REFERENCE TO RELATED APPLICATIONS

This application is a National Stage application of PCT/EP2018/086848, filed Dec. 24, 2018, which claims the benefit of European Application No. 17210412.7, filed Dec. 22, 2017, European Application No. 17210400.2, filed Dec. 22, 2017, European Application No. 17210434.1, filed Dec. 22, 2017, European Application No. 17210485.3, filed Dec. 22, 2017, European Application No. 17210447.3, filed Dec. 22, 2017, and European Application No. 17210534.8, filed Dec. 22, 2017, all of which are incorporated by reference in their entirety herein.

The present invention relates to a process for the preparation of an ethylene and propylene ionomer. The invention further relates to such ethylene and propylene ionomer obtained thereby.

BACKGROUND

Thermoplastic elastomers (TPE), sometimes referred to as thermoplastic rubbers, are a class of copolymers or a physical mix of polymers (usually a plastic and a rubber), which consist of materials with both thermoplastic and elastomeric properties. The cross-links in TPE's can be of physical nature, based on e.g. phase separation, crystallization, ionic or other electrostatic interactions and/or hydrogen bonding, or chemical nature, i.e., reversible covalent bonds.

Polyolefin-based TPE copolymers are typically semi-crystalline polyolefins with varying levels of crystallinity and are typically classified as POP's or POE's. Typically, these are random copolymers of ethylene and α-olefins such as propylene, 1-butene, 1-hexene or 1-octene. The presence of the comonomer disturbs the crystallinity of the polymer and the amount of comonomer determines the softness of the material. A drawback of these materials is that with increasing comonomer content—generally—also the melting point drops, which limits the thermal application window of the material. The upper temperature at which the material can be used decreases, especially since the heat deflection temperature (HDT), which is the temperature at which a polymer deforms under a specific load, may decrease, whereas tensile creep at a certain temperature may increase.

Functionalized polyolefins are known in the art.

For example, EP 3034545 discloses a process for the preparation of a graft copolymer comprising a polyolefin main chain and one or multiple polymer side chains, the process comprising the steps of:

A) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising:
  i) a metal catalyst or metal catalyst precursor comprising a metal from Group 3-10 of the IUPAC Periodic Table of elements;
  ii) optionally a co-catalyst;

B) reacting the polyolefin main chain having one or multiple metal-pacified functionalized short chain branches obtained in step A) with at least one metal substituting agent to obtain a polyolefin main chain having one or multiple functionalized short chain branches;

C) forming one or multiple polymer side chains on the polyolefin main chain, wherein as initiators the functionalized short chain branches on the polyolefin main chain obtained in step B) are used to obtain the graft copolymer.

EP 1186619 discloses inter alia a polar group-containing olefin copolymer comprising a constituent unit represented by the following formula (1), a constituent unit represented by the following formula (2) and a constituent unit represented by the following formula (3), having a molecular weight distribution (Mw/Mn) of not more than 3, and having an intensity ratio of Tαβ to Tαα+ Tαβ (Tαβ/Tαα+ Tαβ)), as determined from a $^{13}$C-NMR spectrum of said copolymer, of not more than 1.0:

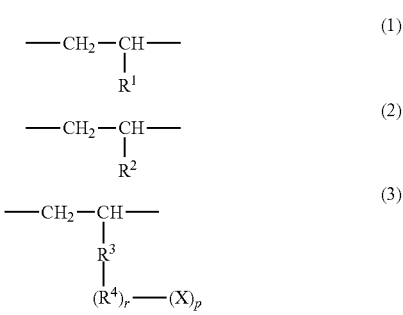

wherein $R^1$ and $R^2$ may be the same or different and are each a hydrogen atom or a straight-chain or branched aliphatic hydrocarbon group of 1 to 18 carbon atoms; $R^3$ is a hydrocarbon group; $R^4$ is a hetero atom or a group containing a hetero atom; r is 0 or 1; X is a polar group selected from an alcoholic hydroxyl group, a phenolic hydroxyl group, a carboxylic acid group, a carboxylic acid ester group, an acid anhydride group, an amino group, an amide group, an epoxy group and a mercapto group; p is an integer of 1 to 3; and when p is 2 or 3, each X may be the same or different, and in this case, if r is 0, X may be bonded to the same or different atom of $R^3$, and if r is 1, X may be bonded to the same or different atom of $R^4$.

WO 97/42236 discloses a process to produce functionalized polyolefins by copolymerizing at least one polar monomer and at least one olefin under effective copolymerization conditions using a catalyst system containing a transition metal complex and a cocatalyst. The at least one olefin can be the predominate monomer forming the functionalized polyolefin chain. The transition metal complex includes a transition metal having a reduced valency which is selectable from groups 4-6 of the Periodic Table of the Elements, with a multidentate monoanionic ligand and with two monoanionic ligands. A polar monomer has at least one polar group and that group is reacted with or coordinated to a protecting compound prior to the copolymerization step.

Ionomers are also known in the art and may be prepared by copolymerization of olefins and olefins containing acidic groups followed by treatment with a salt. A problem with many ionomeric materials is that the amount of functionalisation of the polymer and the overall molecular structure of the polymer is difficult to control.

There remains a need for a process, which allows the manufacture of ionomers having well controlled polymer functionalization which allows for an accurate tuning of the final ionomers desired properties.

SUMMARY

It is therefore an object of the present invention to provide a polyolefinic material in which the above-mentioned and/or other problems are solved and further a process, which allows the manufacture of ionomers, the properties of which can be tuned relatively easily and accurately as desired.

Without willing to be strictly bound to it the present inventors believe that the functionalities of certain functionalized polyolefins tend to cluster which in itself means that a certain degree of cross-linking is inherently present in at least some types of functionalized polyolefins, which is in particular noticeable in amorphous functionalized polyolefins. The present inventors however further found that these cross-links can be enhanced by addition of materials that effectively result in formation of ionic bonds. Such materials are referred to herein as ionomers.

Accordingly, the present invention provides a process for the manufacture of an ethylene and propylene ionomer comprising the steps of:

a) copolymerizing ethylene, propylene and at least one masked functionalized olefin monomer in the presence of a catalyst system, wherein the masked functionalized olefin monomer is a reaction product of a functionalized olefin monomer represented by the structure according to Formula (I) and a masking agent:

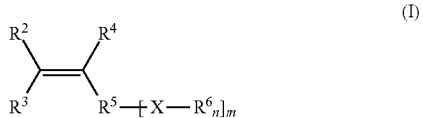

(I)

wherein $R^2$, $R^3$, and $R^4$ are each independently selected from the group consisting of H and hydrocarbyl with 1 to 16 carbon atoms, wherein $R^5$—[X—($R^6$)$_n$]$_m$ is a polar functional group containing one or multiple heteroatom containing functionalities X—($R^6$)$_n$ wherein X is selected from —O—, —S— or —CO$_2$— and $R^6$ is H, and n is 1, or X is N and $R^6$ is each independently selected from the group consisting of H and a hydrocarbyl group with 1 to 16 carbon atoms, and n is 2, wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms and $R^5$ comprises 1 to 10 carbon atoms, wherein $R^3$ and $R^5$ may together form a ring structure that is functionalized with one or multiple X—($R^6$)$_n$, where X is attached to either the main chain or side chain of $R^5$, where m is an entire number between 1 and 10, preferably 1 or 2, and either b1) treating the product of step a1) with a protic solution containing metal salts, ammonium salts or amines to perform an exchange reaction, or a2) contacting the product of a1) with a Brønsted acid solution capable to abstract the residue derived from the masking agent from the functionalized ethylene and propylene copolymer of step a1) to obtain the functionalized ethylene and propylene copolymer, and either b2) treating the product of step a2) with a monovalent metal salt, a monocationic ammonium salt or a monofunctional amine, or b3) treating the product of step a2) with a multi-valent metal salt, a polycationic ammonium salt or a polyfunctional amine.

The product obtained in steps b1, b2 or b3 is an ethylene and propylene ionomer. For the avoidance of doubt, the ionomer is thus a copolymer of ethylene and propylene which has been functionalized such as to allow the formation of ionic bonds. The ethylene propylene ionomer may be amorphous or semi-crystalline. Crystallinity is determined with differential scanning calorimetry as disclosed herein.

DETAILED DESCRIPTION

The protic solution in step b1) is a substantially neutral solution meaning a solution having a pH of from 6-8, preferably from 6.5 to 7.5.

A hydrocarbyl in the sense of the invention may be a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents.

An ethylene and propylene ionomer in the sense of the invention may be for example a polymer material consisting of a thermoplastic resin bearing a fraction of ionized units covalently bonded to the polymer backbone.

A functionalized olefin monomer in the sense of the invention may be an olefin monomer comprising a polar functional group, especially a protic functional group, such as for example an alcohol, an acid, a thiol or an amine.

A polyfunctional protic compound in the sense of the invention may be a compound comprising at least two or more protic functions, such as for example polyfunctional alcohols or amines, such as diols and diamines, whereby a polyfunctional protic compound includes water, especially demineralized water.

According to the invention the ethylene and propylene ionomer may be amorphous or semi-crystalline. The term "semi-crystalline" is known to a skilled person per se. For the avoidance of doubt and in the context of the present invention, semi-crystalline means that a melting endotherm as measured by differential scanning calorimetry (DSC) can be observed. The ethylene and propylene ionomer is determined to be semi-crystalline by DSC when there is a melting endotherm within the range of 25° C. to 300° C. in the second heating curve at a heating rate of 10° C./min.

The copolymer prepared in step a), i.e. the functionalized ethylene propylene copolymer is a random copolymer.

The term "amorphous" is known to a skilled person per se. For the avoidance of doubt and in the context of the present invention the term "amorpohous" means that no melting endotherm as measured by DSC is observed. The ethylene and propylene ionomer is determined to be amorphous by DSC when there is no melting endotherm within the range of 25° C. to 300° C. in the second heating curve at a heating rate of 10° C./min.

For the purpose of determining crystallinity it may be advantageous to perform the DSC measurement on the ethylene propylene copolymer obtained prior to the formation of ionic links. Anyhow the crystallinity of the final ionomer and the product obtained in step a1 or a2 is assumed to be substantially the same if not identical.

Advantageously, the ethylene and propylene ionomer according to the invention may have a broad application window, especially a higher heat deflection temperature (HDT) as measured for example according to ASTM 648 and/or a reduced tensile creep at a certain temperature, which may be measured according to ISO899-1 compared to non-functionalized polyolefins with a similar crystallinity.

An ethylene and propylene ionomers according to the invention may comprise at least one type or reversible or dynamic cross-links or at least two types of different reversible or dynamic cross-links, whereby for example preferably at least one type of reversible or dynamic cross-links may be based on crystallization and/or at least one type of reversible or dynamic cross-links may be based on electrostatic interactions of ions.

Cross-linked polymer systems containing at least one type of cross-links may be capable of dissipating strain energy, preferably for example leading to an improved toughness and/or fracture toughness.

Cross-linked polymer systems containing at least two types of different cross-links consisting of at least one type of reversible or dynamic cross-links (often called transient) may be capable of dissipating strain energy, preferably for example leading to an improved fracture toughness, and may be capable of storing elastic energy, preferable for example giving rise to shape-memory and self-healing properties.

Having at least two types of different reversible or dynamic cross-links may thereby allow for good processability and/or recyclability at high temperature where network interactions are weakened while still having the full benefit of a dual network system at lower temperatures, where network interactions may improve material properties and/or provide unique material properties.

Shape memory (co)polymers are responsive polymers that can adopt desired deformed temporary shapes upon the simultaneous action of a mechanical deformation and of an external stimulus (i.e., heating above their transition temperature). Furthermore, shape memory (co)polymers can recover their original shapes simply upon applying the same or a different external stimulus (e.g., heating above their transition temperature).

Shape memory (co)polymers generally contain two types of different cross-links, whereby at least one needs to be a reversible cross-link (called transient). When these double cross-linked materials deform, the transient bonds may break and dissipate strain energy. The presence of these transient bonds may also delay macroscopic rupture. Both these effects may contribute to an increase in fracture toughness. When the same materials are heated to break the transient cross-links, deformed and subsequently cooled under strain to reform the transient cross-links, the formation of the transient cross-links fixes the material in the temporary shape. Upon reheating, the transient cross-links may break again so that the system recovers to the initial shape.

Furthermore, reversible or dynamic cross-links that can reform for example upon heating may help with self-healing properties.

According to the invention, the ethylene and propylene ionomers may comprise at least one type of reversible or dynamic cross-links or at least two types of different reversible cross-links and/or may be used as shape memory copolymers and/or self-healing copolymers and/or may show improved fracture toughness.

Moreover, ethylene and propylene ionomers according to the invention that may comprise at least one type of reversible or dynamic cross-links or at least two types of different reversible cross-links may be especially easy to process and/or to recycle, preferably while having good mechanical properties and/or a good mechanical stability, especially for example at lower temperatures.

According to the invention, the ethylene and propylene ionomers obtained in step b1) may comprise electrostatic interactions between monoanionic polar functionalities at the polymer chain and monovalent metal cations (like $Na^+$) or monocationic ammonium ions (like $NH_4^+$).

According to the invention, the ethylene and propylene ionomers obtained in step b2) may comprise electrostatic interactions between multiple monoanionic polar functionalities at the polymer chain and multivalent metal cations (like $Zn^{2+}$) or polycationic ammonium ions (like $H_3N^+CH_2CH_2NH_3^+$).

Cross linked in the sense of the present invention may mean having interactions between different polymer chains. Such interactions may be for example electrostatic interactions, especially for example electrostatic interactions of anions of different polymers chains with multi valent metal cations (like $Zn^{2+}$) or polycationic ammonium ions (like $H_3N^+CH_2CH_2NH_3^+$). This may lead to cross-linked ethylene and propylene ionomers comprising multi-charge electrostatic interactions.

Alternatively, interactions may thereby mean for example electrostatic interactions of anions on different polymers chains with monovalent metal cations (like $Na^+$) or monocationic ammonium ions (like $NH_4^+$). This may lead to cross-linked systems of ethylene and propylene ionomers comprising single-charge electrostatic interactions.

In the process of the invention it is preferred that in step b1) or b2) the metal salt is a fluoride, chloride, bromide, iodide, hydroxide, nitrite, nitrate, formate, acetate, bicarbonate, carbonate, sulfite, sulfate, chlorate, perchlorate, bromate or EDTA salt of a metal selected from one or more of lithium, sodium, potassium and silver and/or the monofunctional amine is selected from $NH_3$, $Me_2NH$, $NMe_3$, $EtNH_2$, $Et_3N$, $BuNH_2$ and/or the ammonium salts is a fluoride, chloride, bromide, iodide, hydroxide, nitrite, nitrate, formate, acetate, bicarbonate, carbonate, sulfite, sulfate, chlorate, perchlorate or bromate salt of $NH_4^+$, $Et_3NH^+$, $Bu_4N^+$.

In the process of the invention it is preferred that in step b1) or b3) the multi-valent metal salt is a fluoride, chloride, bromide, iodide, hydroxide, nitrite, nitrate, formate, acetate, bicarbonate, carbonate, sulfite, sulfate, chlorate, perchlorate, bromate or EDTA salts of the magnesium, calcium, strontium, barium, zinc, copper, tin, silver, iron, chrome, aluminum or gallium and/or the polyfunctional amine is selected from ethylene diamine, N,N,N',N'-tetramethyl ethylene diamine, 1,3-diaminopropane, hexamethylenediamine, piperazine, diethylene triamine, N,N,N',N'',N''-pentamethyl diethylene triamine, polyethylenimine.

According to the invention, a polycationic ammonium salt may be the polycationized form of a polyfunctional amine in the sense of the invention, including tetraalkyl ammonium salts.

According to the invention, a Brønsted acid solution is used in step a2) to abstract the residue derived from the masking agent and comprises inorganic and/or organic acids such as hydrochloric acid, hydrobromic acid, hydroiodic acid, hydrofluoric acid or their ammonium salts, phosphoric acid, sulfuric acid, nitric acid, formic acid, acetic acid, citric acid, ethylenediaminetetraacetic acid or partially neutralized carboxylic acid-containing chelates, such as EDTA salts, especially disodium edetate (a disodium salt of EDTA), or combinations of those. The so-called "de-masking" step using a Brønsted acid is known per se.

It was found that the ethylene and propylene ionomer prepared according to the invention has a high heat deflection temperature (HDT), good ductile properties at lower temperature as well as low tensile-creep and good elastic properties at higher temperatures, which allow it to be used for various applications. The ethylene and propylene ionomer of the invention shows clear elastic hysteresis and do not flow or creep as ionomeric ethylene and propylene copolymers may do. The ethylene and propylene ionomer is processable at elevated temperatures, indicating that either a thermal reversible or a dynamic cross-linked system (vitrimer) may exist.

The electrostatic interactions within the ethylene and propylene ionomers can be tuned by selecting the proper type and amount of metal salts (monovalent versus multivalent metal ions), ammonium salts or amines (monofunctional or polyfunctional ammonium salts or amines).

When a monofunctional or polyfunctional amine or ammonium compound is used, the resulting compound is an ethylene and propylene ionomer at a low temperature while it may not be ethylene and propylene ionomer at a higher temperature. Thus may be a thermally reversible cross-linked system.

When a metal salt or a tetraalkyl ammonium salt is used, the resulting product remains ionomeric at low and high temperatures, but it becomes fluxional (=processable, moldable) at a high temperature. This is a so-called dynamic cross-linked system, also called vitrimer system.

The ethylene and propylene ionomers according to the invention show good abrasion and scuff resistance, chemical resistance, oil resistance, antistatic properties, moisture absorption properties, surface hydrophilic properties, antimicrobial properties and antifungal properties.

The ethylene and propylene ionomers according to the invention can be used as an elastomeric or rubbery material. In particular, the ethylene and propylene ionomers according to the invention can replace the existing elastomeric material used in high temperature applications such as (thermoplastic) polyurethane and thermoplastic vulcanisates.

The ethylene and propylene ionomer according to the invention has a good flowability and processability.

Step a1)

Polymerization

According to the invention ethylene and propylene and one or multiple functionalized olefin monomers are polymerized.

According to the invention the ethylene to propylene weight ratio in step a) is preferably from 20:80 to 70:30, preferably from 25:75 to 60:40.

The polymerization step may use two, three or more types of functionalized olefin monomers.

Functionalized Olefin Monomer

The functionalized olefin monomer has the following structure and is a reaction product of a compound represented by the structure according to Formula (I) and a masking agent:

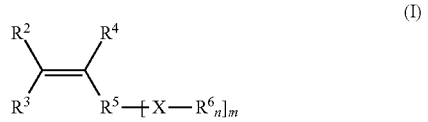
(I)

wherein $R^2$, $R^3$, and $R^4$ are each independently selected from the group consisting of H and hydrocarbyl with 1 to 16 carbon atoms, wherein $R^5$—$[X—(R^6)_n]_m$ is a polar functional group containing one or multiple heteroatom containing functionalities $X—(R^6)_n$ wherein X is selected from —O—, —S— or —CO$_2$— and $R^6$ is H, and n is 1, or X is N and $R^6$ is each independently selected from the group consisting of H and a hydrocarbyl group with 1 to 16 carbon atoms, and n is 2, wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms and $R^5$ comprises 1 to 10 carbon atoms, wherein $R^3$ and $R^5$ may together form a ring structure that is functionalized with one or multiple $X—(R^6)_n$, where X is attached to either the main chain or side chain of $R^5$, where m is an entire number between 1 and 10, preferably 1 or 2.

Preferably, X is selected from —O— or —CO$_2$—.

In a preferred embodiment, the functionalized olefin monomer according to Formula I is a hydroxyl- or carboxylic acid-bearing α-olefin or hydroxyl- or carboxylic acid-functionalized ring-strained cyclic olefin monomer, preferably a hydroxyl, a dihydroxyl or carboxylic acid α-olefin monomer.

Hydroxyl-bearing functionalized olefin monomers may correspond for example to Formula I wherein $R^2$, $R^3$, and $R^4$ are each H and wherein X is —O— and wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms. Examples of $R^5$ groups are —(CH$_2$)$_9$— and —(CH$_2$)$_2$—.

Further examples of the hydroxyl-functionalized functionalized olefin monomer include, but are not limited to allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol and 10-undecene-1-ol.

Even further examples of functionalized olefin monomer include hydroxyl-functionalized ring-strained cyclic olefins (also called internal olefins), which may be for example typically hydroxyl-functionalized norbornenes, preferably 5-norbornene-2-methanol. They correspond to Formula I wherein $R^2$ and $R^4$ are H and $R^3$ and $R^5$ together for a ring structure that is functionalized with X—H, wherein X is —O—.

Carboxylic acid-bearing functionalized olefin monomers may for example correspond to Formula I wherein $R^2$, $R^3$, and $R^4$ are each H and wherein X is —CO$_2$— and wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms. An example of an $R^5$ group is —(CH$_2$)$_8$—. Preferred acid functionalized olefin monomers may be selected from the group of 4-pentenoic acid or 10-undecenoic acid.

Accordingly, it is preferred that the functionalized monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, preferably 3-buten-1-ol, 3-buten-2-ol, 10-undecen-1-ol, 4-pentenoic acid and 10-undecenoic acid.

It is preferred that the amount of the functionalized olefin monomers in step a) is from 0.01 to 30 mol %, preferably from 0.02 to 20 mol % or from 0.05 to 10 mol %, with respect to the total molar amount of the olefin monomers and the functionalized olefin monomers. Most preferred is a range of 0.1 to 5 mol %.

Masking Agent

The hydrogen atoms ($R^6$) directly bound to X in the functionalized olefin monomer has a Brønsted acidic nature poisonous to the highly reactive catalyst. A masking agent is used, which can react with the acidic hydrogen and binds to the monomer comprising the polar group. This reaction will prevent a reaction of the acidic polar group (—X—H) with the catalyst and will hamper coordination of the polar group (—X—) to the catalyst.

The molar amount of the masking agent preferably is at least the same molar amount as monomer of formula (I) used in the process according to the invention. Preferably, the molar amount of masking agent is at least 10% higher than the molar amount of monomer of formula (I), or at last 20% higher. Typically, the amount of masking agent is less than 500% of monomer according to formula (I). In some occasions higher amounts may be used or may be necessary.

Examples of masking agents are silyl halides, trialkyl aluminum complexes, dialkyl magnesium complexes, dialkyl zinc complexes or trialkyl boron complexes. In the process of the invention it is preferred that the masking agent is selected from trialkyl aluminum complexes, dialkyl magnesium complexes, dialkyl zinc complexes or trialkyl boron complexes. Preferred complexes are trialkyl aluminum complexes. Preferably, these trialkyl aluminum complexes have bulky substituents, like for example isobutyl groups. The most preferred masking agent is triisobutylaluminum.

Metal catalyst and/or catalyst precursor suitable for the process according to the invention. The process according to the invention is performed in the presence of a suitable catalyst system.

In the section below several examples for single-site catalyst precursors, which may be used to prepare the metal catalyst used in the present invention, are specified. Metal catalysts that are suitable may be obtained by reacting the metal catalyst precursors with a co-catalyst either prior to the use in the polymerization or by in situ reaction with a co-catalyst.

A single-site-catalyst is a catalyst that contains a single, catalytically active, metal center. The metal atom has an open coordination site where it binds olefin monomers, which are subsequently polymerized. Single-site catalysts precursors include those found in *Chem. Rev.* 2000, 100, 1167-1682. A special case of single-site catalysts forms the multinuclear catalysts consisting of different but well-defined (single-site) catalytic sites within one and the same catalyst molecule. Examples of such multinuclear catalysts can be found in *Chem. Rev.* 2011, 111, 2450-2485.

Examples of single-site catalysts are metallocene catalysts. Typically, a metallocene catalyst refers to a sandwich complex comprising a transition metal, group 3 metal or lanthanide coordinated to two members of five-member carbon ring, i.e. substituted cyclopentadienyl (Cp), hetero-substituted five- or six-membered aromatic ring, or a bridged (ansa) ligand consisting of five-member carbon rings and/or hetero-substituted five- or six-membered aromatic rings.

Other examples of single-site catalysts are half-metallocenes. Half-metallocene catalysts in the present description may mean especially for example: a metal catalyst or catalyst precursor typically consisting of one five-member carbon ring, i.e. substituted cyclopentadienyl (Cp), hetero-substituted five- or six membered aromatic ring, bound to a metal active site.

Other examples of single-site catalysts are post-metallocenes. Post-metallocene catalysts in the present description may mean especially for example: a metal catalyst that contains no substituted cyclopentadienyl (Cp) ligands, but may contains one or more anions bound to the metal active site, typically via a heteroatom.

Examples of half-metallocene and post-metallocene catalyst precursors can for example be found in *Chem. Rev.* 2003, 103, 283-315, *Chem. Rev.* 2011, 111, 2363-2449 and *Angew. Chem. Int. Ed.* 2014, 53, 9722-9744. Examples of late transition metal catalysts can for example be found in: *Chem. Rev.* 2015, 115, pp 12091-12137

Examples of supported single-site catalyst systems can for example be found in *Chem. Rev.* 2005, 105, 4073-4147.

In the single-site catalyst or single-site catalyst precursors, which may be used in the invention the transition metal might not be present in its highest oxidation state, but in a lower oxidation state. The "oxidation state" of an atom in a molecule gives the number of valence electrons it has gained or lost. The highest oxidation state of titanium is +4 and of chromium is +6. These metals can be present in the catalyst used in the process according to the present invention in a lower oxidation state: titanium preferably as $Ti^{3+}$, chromium as $Cr^{3+}$. This may contribute to reduce the catalyst's sensitivity to poisoning by nucleophilic functions of the comonomer.

Suitable metal catalyst precursors can be also the trivalent transition metal as those described in WO 9319104 or in WO 9613529.

According to the invention, said low valent catalyst precursor can be for example $[(C_5H_4)CH_2CH_2N(Me)_2]MCl_2$, $[(C_5Me_4)CH_2CH_2N(Me)_2]MCl_2$, $[(C_5H_4)CH_2CH_2N(i-Pr)_2]MCl_2$, $[(C_5Me_4)CH_2CH_2N(i-Pr)_2]MCl_2$, $[(C_5H_4)CH_2CH_2N(n-Bu)_2]MCl_2$, $[(C_5Me_4)CH_2CH_2N(n-Bu)_2]MCl_2$, $[(C_9H_6)CH_2CH_2N(Me)_2]MCl_2$, $[(C_9H_6)CH_2CH_2N(i-Pr)_2]MCl_2$, $[(C_5Me_4)C_9H_6N]MCl_2$, $[(C_5Me_3(SiMe_3))C_9H_6N]MCl_2$, $[(C_9H_6)C_9H_6N]MCl_2$, $[(C_5Me_4)CH_2C_5H_4N]MCl_2$ or $[(C_9H_6)CH_2C_5H_4N]MCl_2$, where M is titanium or chromium.

Other non-limiting examples of metal catalyst precursors that would be suitable according to the present invention are: (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenylphosphino)ethyl-tetramethylcyclopentadienyl titanium dichloride, (diphenylphosphino)methyldimethylsilyl-tetramethylcyclopentadienyl titanium dichloride.

In a preferred embodiment of the invention, the metal catalyst precursor is $[(C_5Me_4)CH_2CH_2N(Me)_2]TiCl_2$.

According to the invention, other suitable low valent catalyst precursors can be for example {N',N"-bis[2,6-di(1-methylethyl)phenyl]-N,N-diethylguanidinato} metal dichloride, {N',N"bis[2,6-di(1-methylethyl)phenyl]-N-methyl-N-cyclohexylguanidinato} metal dichloride, {N',N"-bis[2,6-di(1-methylethyl)phenyl]-N,N-pentamethyleneguanidinato} metal dichloride, {N',N"-bis[2,6-di(methyl)phenyl]-sec-butyl-aminidinato} metal dichloride, {N,N'-bis(trimethylsilyl)benzamidinato} metal dichloride, {N-trimethylsilyl,N'—(N",N"-dimethylaminomethyl)benzamidinato} metal dichloride and their THF or other Lewis base adducts, where metal is titanium or chromium.

In a preferred embodiment of the invention, the metal catalyst precursors are $[C_6H_5C(NSiMe_3)_2]TiCl_2(THF)_2$ and $[C_6H_5C(NSiMe_3)CH_2CH_2N(CH_3)_2]TiCl_2(THF)$.

Other examples of suitable catalysts are so-called metallocene catalysts precursors, including zirconocene and hafnocene dichloride metal catalyst precursors, as for example described in WO2016102690, WO 9411406, U.S. Pat. No. 6,342,622 and WO 2017118617.

In another embodiment, the metal catalysts or metal catalyst precursors is bis(n-butyl-cyclopentadienyl) zirconium dichloride, bis(pentamethylcyclopentadienyl) zirconium dichloride, bis(2-phenyl-indenyl) zirconium dichloride, rac-dimethylsilyl-bis(1-indenyl) zirconium dichloride, rac-dimethylsilyl-bis(2-methyl-1-indenyl) zirconium dichloride, rac-dimethylsilyl-bis(2-methyl-4-phenyl-1-indenyl) zirconium dichloride, diphenylmethylene-(cyclopentadienyl)(2,7-di-t-butyl-fluorenyl) zirconium dichloride, diphenylmethylene-(3-methyl-cyclopentadienyl)(2,7-di-t-butyl-fluorenyl) zirconium dichloride, diphenylmethylene-(3-t-butyl-cyclopentadienyl)(2,7-di-t-butyl-fluorenyl) zirconium dichloride, diphenylmethylene-(cyclopentadienyl)(2,7-di-t-butyl-fluorenyl) hafnium dichloride, diphenylmethylene-(3-methyl-cyclopentadienyl)(2,7-di-t-butyl-fluorenyl) hafnium dichloride, diphenylmethylene-(3-t-butyl-cyclopentadienyl)(2,7-di-t-butyl-fluorenyl) hafnium dichloride, rac-methylene-bis(3-t-butyl-1-indenyl) zirconium dichloride, rac-dimethylmethylene-bis(3-t-butyl-1-indenyl) zirconium dichloride, rac-methylene-bis(3-t-butyl-1-indenyl) hafnium dichloride, rac-dimethylmethylene-bis(3-t-butyl-1-indenyl) hafnium dichloride, rac-dimethylsilyl-bis(1-indenyl) hafnium dichloride, dimethylsilyl(1,3-dimethyl-inden-2-yl)(2,4-diphenyl-inden-1-yl) hafnium dimethyl, dimethylsilyl(2-phenyl-inden-1-yl)(2,3,4,5-tetramethylcyclopentyl) hafnium dimethyl, dimethylsilyl(1,3-dimethyl-inden-2-yl) (2-phenyl-inden-1-yl) hafnium dimethyl, [2,2'-di-(cyclopenta[a]naphthalen-2-yl)biphenyl]zirconium dichloride, [2,2'-bis(cyclopenta[a]naphthalene-2-yl)biphenyl]hafnium dichloride, [2,2'-bis(cyclopenta[al naphthalene-2-yl)-4,4'-di-tert-butyl biphenyl]zirconium dichloride, [2,2'-bis(cyclopenta[a]naphthalene-2-yl)-4,4'-di-tert-butylbiphenyl]zirconium dichloride, [2,2'-bis(cyclopenta[a]naphthalene-2-yl)-4,4',5,5'-tetramethylbiphenyl]zirconium dichloride, [2,2'-bis(cyclopenta[a]naphthalene-2-yl)-4,4',5,5'-tetramethylbiphenyl]zirconium dichloride, [2,2'-Bis(5-6, 7, 8, 9-tetrahydro-cyclopenta[a] naphthalene-2-yl)-4,4'-di-tertbutyl-biphenyl]zirconium dichloride, rac-diethylsilyl-bis (5-cyclopenta[a]naphthalen-2-yl) zirconium dimethyl, dimethylsilyl(1,3-dimethyl-inden-2-yl)(2,4-diphenyl-inden-1-yl) zirconium dichloride, dimethylsilyl (2-phenyl-inden-1-yl)(2,3,4,5-tetramethylcyclopentyl) zirconium dichloride, dimethylsilyl(1,3-dimethyl-inden-2-yl) (2-phenyl-inden-1-yl) zirconium dichloride, dimethylsilyl (1,3-dimethyl-inden-2-yl) (2-phenyl-cyclopenta[a]naphthalen-3-yl) zirconium dichloride, dimethylsilyl (1,3-dimethyl-inden-2-yl) (2-phenyl-cyclopenta[a]naphthalen-3-yl) hafnium dimethyl.

In another embodiment, the metal catalysts or metal catalyst precursors are rac-dimethylsilyl bis(2-methyl-4-phenyl-1-indenyl) zirconium dichloride, dimethylsilyl bis(1,3-dimethyl-inden-2-yl)(2,4-diphenyl-inden-1-yl) hafnium dimethyl, dimethylsilyl (1,3-dimethyl-inden-2-yl)(2-phenyl-cyclopenta[a]naphthalen-3-yl) zirconium dichloride.

According to the invention, examples of suitable catalysts are so-called constrained geometry catalysts. Non-limiting examples of titanium(IV) dichloride metal catalyst precursors according to Formula XIV suitable for use in the present invention are: (N-t-butylamido)(dimethyl)(tetramethylcyclopentadienyl)silane titanium dichloride, (N-phenylamido)(dimethyl)(tetramethylcyclopentadienyl) silane titanium dichloride, (N-sec-butylamido)(dimethyl)(tetramethylcyclopentadienyl)silane titanium dichloride, (N-sec-dodecylamido)(dimethyl)(fluorenyl)silane titanium dichloride, (3-phenylcyclopentadien-1-yl) dimethyl(t-butylamido) silane titanium dichloride, (3-(pyrrol-1-yl)cyclopentadien-1-yl) dimethyl(t-butylamido)silane titanium dichloride, (3,4-diphenylcyclopentadien-1-yl)dimethyl(t-butylamido) silane titanium dichloride, 3-(3-N,N-dimethylamino)phenyl) cyclopentadien-1-yl)dimethyl(t-butylamido) silane titanium dichloride, (P-t-butylphospho)(dimethyl) (tetramethylcyclopentadienyl) silane titanium dichloride.

In another embodiment of the metal catalyst precursor is (N-t-butylamido)(dimethyl)(tetramethylcyclopentadienyl) silane titanium dichloride.

The metal catalysts or metal catalyst precursors for use in the present invention may also be from the group of metal catalysts or metal catalyst precursors having no cyclopentadienyl groups, in other words, non-cyclopentadienyl metal catalysts or metal catalyst precursors.

In a preferred embodiment of the metal catalyst precursor is [N-(2,6-di(I-methylethyl)phenyl)amido)(2-isopropylphenyl) (α-naphthalen-2-diyl(6-pyridin-2-diyl)methane)]hafnium dimethyl or bis[2-(1,1-dimethylethyl)-6-[(pentafluorophenylimino)methyl] phenolato] titanium dichloride.

Co-Catalysts

A co-catalyst can be used when a metal catalyst precursor is applied. The function of this co-catalyst is to activate the metal catalyst precursor. Co-catalysts may be selected for example from the group consisting of aluminum alkyls and aluminum alkyl halides, such as for example triethyl aluminum (TEA) or diethyl aluminum chloride (DEAC), MAO, DMAO, MMAO, SMAO, solid MAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. $B(R')_y$ wherein R' is a fluorinated aryl and y is 3 or 4, respectively). Examples of a fluorinated borane is $B(C_6F_5)_3$ and of fluorinated borates are $[X]^+[B(C_6F_5)_4]^-$ (e.g. $X=Ph_3C$, $C_6H_5N(H)Me_2$). For more examples see for example *Chem. Rev.* 2000, 100, 1391-1434.

MAO generally contains significant quantities of free trimethyl aluminum (TMA), which can be removed by drying the MAO to afford the so-called depleted MAO or DMAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Supported MAO (SMAO) may also be used and may be generated by the treatment of an inorganic support material, typically silica, by MAO. Solid MAO may also be used and may be generated as described in US2013/0059990 and WO 2017090585 A1.

Other examples of polymeric or oligomeric aluminoxanes are tri(isobutyl) aluminum- or tri(n-octyl) aluminum-modified methylaluminoxane, generally referred to as modified methylaluminoxane, or MMAO.

Neutral Lewis acid modified polymeric or oligomeric aluminoxanes may also be used, such as alkylaluminoxanes modified by addition of a hydrocarbyl substituted Group 13 compound having 1 to 30 carbons, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

In the present invention, MAO, DMAO, SMAO, solid MAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., *Chem. Rev.* 2000, 100, 1391. Suitable alkylating agents are trialkyl aluminum compounds, preferably triisobutylaluminum (TIBA). Suitable cation forming agents for use herein include (i) neutral Lewis acids, such as $C_1$-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type $[C]^+[A]^-$ where "C" is a cationic group such as ammonium, phosphonium, oxonium, silylium or sulfonium groups and $[A]^-$ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Alternatively, solid MAO can be used as cocatalyst creating a supported catalyst.

Scavengers

A scavenger can optionally be added in the catalyst system in order to react with impurities that are present in the polymerization reactor, and/or in the solvent and/or monomer feed. This scavenger prevents poisoning of the catalyst during the olefin polymerization process. The scavenger can be the same as the co-catalyst but can also independently be selected from the group consisting of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Some masking agents may also function as scavengers and some scavengers may also function as masking agents.

The process according to the invention is best performed in a solution process using a soluble homogeneous- or insoluble heterogeneous catalyst system as described above.

In the process, the polymerization conditions, like for example temperature, time, pressure, monomer concentration can be chosen within wide limits. The polymerization temperature is in the range from −10 to 250° C., preferably 0 to 220° C., more preferably 25 to 200° C. The polymerization time is in the range of from 10 seconds to 20 hours, preferably from 1 minute to 10 hours, more preferably from 5 minutes to 5 hours. The molecular weight of the polymer can be controlled by use of hydrogen or other chain transfer agents like silanes, boranes, zinc alkyls or excess aluminum alkyl species in the polymerization. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In an embodiment, a hindered phenol, such as for example butylhydroxytoluene (BHT), may be added during the polymerization process, especially for example in an amount between 0.1 and 5 mol. equivalents of main group metal compound(s) used as scavenger, cocatalyst and/or masking agent. This may contribute to increase molecular weight and/or comonomer incorporation.

Preferably, the amount of the functionalized olefin monomers in step a1) is 0.01 to 30 mol %, more preferably 0.02 to 20 mol % or 0.10 to 10 mol %, further preferably from 0.05 to 5 mol %, with respect to the total of the olefin monomers and the functionalized olefin monomers.

The invention may involve a further addition of other additives such as a processing stabilizer (primary antioxidant) such as Irganox 1010.

Product

The present invention also relates to the ethylene and propylene ionomer obtainable by the process disclosed herein.

In particular the present invention relates to an ethylene propylene ionomer obtainable by the process of the invention and wherein, the ethylene to propylene weight ratio in the polymer is from 20:80 to 70:30, preferably from 25:75 to 60:40, and said at least one functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, preferably 3-buten-1-ol, 3-buten-2-ol, 10-undecen-1-ol, 4-pentenoic acid and 10-undecenoic acid, wherein the functionalized groups in the ionomer are cross-linked by means of one or more from the group consisting of monovalent metal ions, monocationic ammonium ions, monofunctional amines, multi-valent metal ions, polycationic ammonium ions and polyfunctional amines.

In a preferred embodiment the ethylene and propylene ionomer comprises between 0.1 and 10 molar equivalent, preferably between 0.2 and 8 molar equivalent, further preferred between 0.4 and 5 molar equivalent, of a metal salt, an ammonium salt or an amine with respect to the mol % of functionalized olefin monomers incorporated in the copolymer.

It is preferred that the content of functionalized olefin monomer is between 0.01 and 30 mol %, preferably between 0.02 to 20 mol % or 0.05 to 10 mol %, more preferable 0.1 to 5 mol %, with respect to the total of the olefin monomers and the functionalized olefin monomers in the copolymer.

It is further preferred that the ethylene and propylene ionomer comprises between 0.1 and 10 mol. equivalent, preferably between 0.2 and 8 mol. equivalent, further preferred between 0.4 and 5 mol. equivalent, of a metal salt, an ammonium salt or an amine with respect to the mol % of functionalized olefin monomers incorporated in the copolymer.

It is further preferred that the ethylene propylene ionomer is semi-crystalline.

It is further preferred that the ethylene propylene ionomer contains at least two types of reversible or dynamic cross-links, one of which preferably the presence of crystals.

The invention thus concerns an ethylene and propylene ionomer, wherein the content of functionalized olefin monomer is between 0.01 and 30 mol %, preferably between 0.02 to 20 mol % or 0.05 to 10 mol %, with respect to the total of the olefin monomers and the functionalized olefin monomers in the copolymer.

An ethylene and propylene ionomer according to the invention, may thereby be so that the functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, preferably 3-buten-1-ol, 3-buten-2-ol, 10-undecen-1-ol, 4-pentenoic acid and 10-undecenoic acid.

An ethylene and propylene ionomer according to the invention, may be so that it comprises between 0.1 and 100 mol. equivalent, preferably from 0.1-10 mol. equivaent, mor preferably between 0.2 and 8 mol. equivalent, further preferred between 0.4 and 5 mol. equivalent, of a metal salt, an ammonium salt or an amine with respect to the mol % of functionalized olefin monomers incorporated in the copolymer and/or comprises at least one or two types of (different) reversible cross-links.

An ethylene and propylene ionomer according to the invention, may be so that it comprises single-charge electrostatic interactions and between 0.1 and 10 mol. equivalent, preferably between 0.2 and 8 mol. equivalent, further preferred between 0.4 and 5 mol. equivalent, of a salt of monovalent metal, an ammonium salt or a monofunctional amine with respect to the mol % of functionalized olefin monomers incorporated in the copolymer.

An ethylene and propylene ionomer according to the invention, may be so that it comprises multi-charge electrostatic interactions and comprises between 0.05 and 10 mol. equivalent, preferably between 0.2 and 8 mol. equivalent, further preferred between 0.4 and 5 mol. equivalent, of a salt of a multi-valent metal, a polyfunctional ammonium salt or a polyfunctional amine with respect to the mol % of functionalized olefin monomers incorporated in the copolymer.

An ethylene and propylene ionomer according to the invention, may be so that it a monovalent metal salt may be a fluoride, chloride, bromide, iodide, hydroxide, nitrite, nitrate, formate, acetate, bicarbonate, carbonate, sulfite, sulfate, chlorate, perchlorate, bromate or EDTA salts selected from the alkali metals Li, Na, K, Ag and/or a monofunctional amine may be selected from $NH_3$, $Me_2NH$, $NMe_3$, $EtNH_2$, $Et_3N$, $BuNH_2$ and/or an ammonium salt may be a fluoride, chloride, bromide, iodide, hydroxide, nitrite, nitrate, formate, acetate, bicarbonate, carbonate, sulfite, sulfate, chlorate, perchlorate or bromate salts of $NH_4^+$, $Et_3NH^+$, $Bu_4NH^+$ and/or a multivalent metal salt may be a fluoride, chloride, bromide, iodide, hydroxide, nitrite, nitrate, formate, acetate, bicarbonate, carbonate, sulfite, sulfate, chlorate, perchlorate, bromate or EDTA salts of the following metals Mg, Ca, Sr, Ba, Zn, Cu, Sn, Fe, Cr, Al, Ga and/or a polyfunctional amine may be selected from ethylene diamine, N,N,N',N'-tetramethyl ethylene diamine, 1,3-diaminopropane, hexamethylenediamine, piperazine, diethylene triamine, N,N,N',N'',N''-pentamethyl diethylene triamine, polyethylenimine.

An ethylene and propylene ionomer according to the invention, may be so that the amount of propylene in the functionalized ethylene and propylene copolymer is preferably at least 30 wt %, preferably >35 wt %, further preferred >40 wt %, further preferred >45 wt % with respect to the total of the olefins and the functionalized olefin monomers in the copolymer and/or so that amount of ethylene is between 20 and 70 wt. %, preferably between 25 and 60 wt. % with respect to the total of the olefins and the functionalized olefin monomers in the copolymer.

An ethylene and propylene ionomer according to the invention, may be so that the melting enthalpy may be preferably for example between 5 J/g and 150 J/g, preferably between 10 J/g and 120 J/g, further preferred between 12 J/g and 100 J/g, further preferred between 13 J/g and 90 J/g, further preferred between 14 J/g and 80 J/g, further preferred between 15 J/g and 65 J/g as measured by DSC (by the method and with the equipment described below in the examples).

In an embodiment, the present invention also relates to a thermoplastic composition comprising the ionomer of the invention disclosed herein. Such a thermoplastic composition further comprises at least one thermoplastic polymer is selected from the group consisting of polyolefins such as random polypropylene, polypropylene homopolymer, heterophasic polypropylene copolymers, high density polyethylene, low density polyethylene, linear low density polyethylene, ethylene-propylene copolymers, polyesters, polycarbonates, polyester-carbonates, polyurethanes, polyethers, polyetherimides, polyamides, polystyrene, polyphenylene-oxide, polyacrylates, olefin-acrylate copolymers, polysulfones.

Such a thermoplastic composition may also further comprise at least one inorganic or organic filler material selected from the group consisting of metal oxides and such as titanium oxide, zirconium oxide, aluminum oxide, zinc oxide, iron oxide, metal carbonates such as calcium carbonate, metal sulfates such as calcium sulfate, silicates such as montmorillonite, smectite, talcum, mica, aluminum silicate, silica, glass, carbon-based filler such as carbon black, graphite, graphene, carbon nanotubes.

For the avoidance of doubt, it is to be understood that in the thermoplastic composition the ionomer preferably forms a minor portion of the thermoplastic composition. Thus, the amount of ionomer is preferably at most 30, preferably at most 15 wt. % on the basis of the weight of the thermoplastic composition.

For the avoidance of doubt, it is to be understood that the copolymer prepared in step a1) of the process of the invention or the copolymer in the claimed composition is a random copolymer.

It is noted that the invention relates to all possible combinations of features described herein, preferred in particular are those combinations of features that are present in the claims. It is in particular noted that the preferred materials or preferred amounts of materials as disclosed in the context of the process according to the invention equally apply to the ethylene propylene ionomer.

It is further noted that the term 'comprising' does not exclude the presence of other elements. However, it is also to be understood that a description on a product/composition comprising certain components also discloses a product/ composition consisting of these components. The product/ composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following non-limiting examples, without however being limited thereto.

EXAMPLES $^1$H NMR Characterization

The ethylene content and percentage of functionalization was determined by $^{13}$C and $^1$H NMR analysis carried out at 125° C. The samples were dissolved at 130° C. in deuterated tetrachloroethane (TCE-D2) containing butylated hydroxytoluene (BHT) as stabilizer. The spectra were recorded in 5 mm tubes on a Bruker Avance 500 spectrometer equipped with a cryogenically cooled probe head operating at 125° C.

Chemical shifts are reported in ppm versus tetramethylsilane and were determined by reference to the residual solvent protons.

Differential Scanning Calorimetry (DSC)

Thermal analysis was carried out on a DSC Q100 from TA Instruments at a heating rate of 5° C.·min$^{-1}$. First and second runs were recorded after heating up to 210° C. and cooling down to ca. −40° C. at a rate of 10° C.·min$^{-1}$. All copolymers were found to be semi-crystalline as determined by DSC. The melting enthalpy was calculated as the area under the peak from the melting transition in DSC.

Example 1

The copolymerization reaction of propylene, ethylene, and TiBA-pacified 10-undecenoic acid (entry 4, Table 1) was carried out in a stainless steel autoclave (2.2 L). The reactor, equipped with a mechanical stirrer "interMIG", was operated at 900 rpm. The reactor was first flushed with a mixture of ethylene and propylene at set flows for 30 minutes. Pentamethyl heptane diluent (300 mL), solutions of TiBA solution (1.0 M solution in toluene, 4.0 mmol), TiBA-pacified 10-undecenoic acid (TiBA: 10-undecenoic acid=2:1, 1.0 M, 15 mmol) and MAO (30 wt % solution in toluene, 6.0 mmol) were added. Pentamethyl heptane was added to bring the total volume to 1 L. The reactor was then heated to 85° C. and the overall pressure was brought to 9 bar with a propylene/ethylene mixture (feed rate ratio=80/20) and kept at this pressure using a set ethylene and propylene flow and a bleeding valve set at 9 bar. A solution of rac-Me$_2$Si(2-Me-4-Ph-Ind)$_2$ZrCl$_2$ catalyst precursor prepared in a glovebox by dissolving 3 mg of solid precatalyst in 5 mL toluene (~5 µmol) was injected into the reactor applying an over pressure of nitrogen. The reactor temperature was kept at 85±3° C. by cooling with an oil LAUDA system. At the end of the reaction, the mixture was collected via a bottom drain valve in a beaker containing water/isopropanol mixture (50 wt. %, 500 mL) and Irganox 1010 (1.0 M, 1.0 mmol) and the resulting suspension was filtered, washed with demineralized water (2×500 mL) and dried at 60° C. in vacuo overnight (yield 68.3 g). The product was analyzed by DSC and ICP-MS.

About 20 g of this product was dispersed in toluene (400 mL) containing hydrochloric acid (5.0 M, 2.5 v. %) and heated until a clear solution was obtained. The resulting mixture was cooled down and precipitated in an excess iPrOH. The obtained solid was washed with demineralized water (2×500 mL) and dried at 60° C. in vacuo overnight. The resulting product was analyzed by DSC to determine the crystallinity, $^1$H and $^{13}$C NMR to determine the percentage of functionalization and ethylene content.

Example 2

The copolymerization reaction of propylene, ethylene and TiBA-pacified 10-undecen-1-ol (entry 6, Table 2) was carried out in a stainless steel Büchi reactor (0.3 L). Toluene solutions of the catalyst precursor rac-Me$_2$Si(2-Me-4-Ph-Ind)$_2$ZrCl$_2$ (0.4 µmol) and of TiBA-pacified 10-undecen-1-ol comonomer (TiBA: 10-undecen-1-ol=1:1; 1.0 M, 15 mmol) were prepared in a glovebox. Pentamethyl heptane (120 mL), and MAO (30 wt. % solution in toluene, 0.4 mmol) were injected into the reactor under a nitrogen atmosphere. The solution was then saturated with a propylene/ethylene mixture flow rate ratio=70/30) and stirred for 10 minutes followed by the addition of TiBA-pacified 10-undecen-1-ol (1.0 M, 15 mmol) and catalyst precursor solution (0.4 µmol). Then the reactor was pressurized to the desired set point (6 bar) and the pressure was maintained constant for 20 min using a set ethylene and propylene flow and a bleeding valve set at 6 bar. The reaction was stopped by depressurizing the reactor followed by quenching by pouring the mixture into a beaker containing water/isopropanol mixture (50 wt. %, 300 mL) and Irganox 1010 (1.0 M, 0.5 mmol). The resulting suspension was filtered, washed with demineralized water (2×300 mL) and dried at 60° C. in vacuo overnight (yield 5.6 g). The product was analyzed by DSC and ICP-MS.

About 2 g of this product was dispersed in toluene (100 mL) containing hydrochloric acid (5.0 M, 2.5 v. %) and heated until a clear solution was obtained. The resulting mixture was cooled down and precipitated in an excess iPrOH. The obtained solid was washed with demineralized water (2×100 mL) and dried at 60° C. in vacuo overnight. The resulting product was analyzed by DSC to determine the crystallinity, NMR to determine the percentage of functionalization and ethylene content.

Example 3

The same polymerization procedure as described in example 1 was applied to produce a poly(propylene-co-ethylene-co-undecenoic acid)-based ionomer (entry 7, Table 1). At the end of reaction, the obtained polymer was transferred under N$_2$ atmosphere using a bottom drain valve into a glass flask containing 1.0 L of saturated aqueous NaCl solution. Irganox 1010 (1.0 M, 1.0 mL) was added and the resulting mixture was stirred at 70° C. in an oil bath under N$_2$ atmosphere for about 4 h. The resulting suspension was filtered, washed with iPrOH (2×300 mL) and dried at 60° C. in vacuo overnight (Product A, 75.3 g). The ionomer product obtained was analyzed by DSC and ICP-MS.

Example 4

Part of the polyolefinic ionomer product of Example 3 (about 15 g) was dispersed in toluene (200 mL) containing hydrochloric acid (5 M, 2.5 v. %) and heated until a clear solution was obtained. The resulting mixture was precipitated in an excess iPrOH and filtered. The obtained solid was washed with demineralized water (2×200 mL), iPrOH (2×200 mL) and dried at 60° C. in vacuo overnight (Product B). The poly(propylene-co-ethylene-co-undecenoic acid) was analyzed by DSC and ICP-MS.

Example 5

A fraction of the acid functionalized olefin copolymer product of example 4 (8.5 g) was dispersed in toluene (100 mL) and heated until a clear solution was obtained. $Et_3N$/toluene (10 wt. %, 60 mL) was added and the mixture was stirred at 90° C. for 3 h. Next, the product was precipitated in an excess iPrOH, filtered and dried at 60° C. in vacuo overnight. The poly(propylene-co-ethylene-co-undecenoic acid)-based ammonium ionomer was analyzed by DSC.

Example 6

A copolymer sample as described in experiment 1 (Table 1, entry 3, 5 g) was dispersed in toluene (400 mL) and heated until a nearly clear solution was obtained. Then solid NaH (0.1 g dispersed in 5 mL toluene) was added and the mixture was stirred for 1 h. Then water (1 mL) was added and the solvent was distilled of and all volatiles were removed in vacuum, to yield the poly(ethylene-co-propylene-co-sodium undecenoate) ionomer.

TABLE 1

Copolymerizations of propylene with 10-undecenoic acid using rac-$Me_2Si(2\text{-}Me\text{-}4\text{-}Ph\text{-}Ind)_2ZrCl_2$/MAO catalyst. [a]

| Entry # | TiBA:10-undecenoic acid b (mmol) | $C_2^-/C_3^-$ feed ratio (wt.) | Yield [c] (g) | Com. incorp. (mol. %)[d] | $M_n$ (kg·$mol^{-1}$) | D | M (wt. %) |
|---|---|---|---|---|---|---|---|
| 1 | — | 20:80 | 65.2 | n.a | 44.3 | 2.6 | <0.1 (Al, Na) |
| 2 | — | 30:70 | 62.4 | n.a | 33.1 | 3.4 | <0.1 (Al, Na) |
| 3 | 10 | 20:80 | 59.6 | 0.9 | 46.2 | 2.3 | 0.4 (Al) |
| 4 | 15 | 20:80 | 51.3 | 0.9 | 42.0 | 2.9 | 0.4 (Al) |
| 5 | 20 | 20:80 | 54.2 | 1.2 | 50.5 | 3.2 | 0.7 (Al) |
| 6 | 10 | 30:70 | 46.3 | 0.6 | 32.3 | 2.6 | 0.4 (Al) |
| 7 | 20 | 30:70 | 35.7 | 0.8 | 46.5 | 2.4 | 0.6 (Na), 0.3 (Al) |

[a] Conditions: rac-$Me_2Si(2\text{-}Me\text{-}4\text{-}Ph\text{-}Ind)_2ZrCl_2$ catalyst precursor (5.0 μmol), TiBA (1.0 M solution in toluene) 4 mL, MAO (30 wt % solution in toluene) = 6.0 mmol, $C_3^-/C_2^-$ feed = 9 bar, pentamethyl heptane diluent 1 L, reaction temperature 85° C., reaction time 20 min.
[b] Comonomer 10-undecenoic acid (1.0 M solution in toluene, TiBA:10-undecenoic acid 2:1).
[c] The yield was obtained under non-optimized conditions and determined using the weight of polymer obtained after filtration and drying in vacuum oven overnight at 60° C.
[d] To determine the percentage of functionalization and ethylene content, a fraction of the product was dispersed in toluene (about 300 mL) containing glacial acetic acid 10 v % and hydrochloric acid (5 M, 2.5 v %) and heated until a clear solution was obtained. The resulting mixture was cooled down and precipitated in an excess iPrOH, filtered, washed with demineralized water, dried at 60° C. in vacuo overnight and analysed by NMR.

TABLE 2

Copolymerization of propylene with 10-undecenol using rac-$Me_2Si(2\text{-}Me\text{-}4\text{-}Ph\text{-}Ind)_2ZrCl_2$/MAO catalyst. [a]

| Entry # | TiBA:10-undecenol [b] (mmol) | $C_2^-/C_3^-$ feed ratio (wt.) | Yield (g) [c] | Com. incorp.[d] (mol. %) | Al (wt %) |
|---|---|---|---|---|---|
| 1 | — | 20:80 | 4.9 | n.a. | <0.1 |
| 2 | — | 30:70 | 5.8 | n.a. | <0.1 |
| 3 | 10 | 20:80 | 3.1 | 1.0 | 1.20 |
| 4 | 15 | 20:80 | 4.3 | 1.2 | 0.82 |
| 5 | 10 | 30:70 | 4.7 | 0.9 | 0.64 |
| 6 | 15 | 30:70 | 5.6 | 1.1 | 0.95 |

[a] Conditions: rac-$Me_2Si(2\text{-}Me\text{-}4\text{-}Ph\text{-}Ind)_2ZrCl_2$ catalyst precursor (0.4 μmol), MAO (30 wt % solution in toluene) Al/Zr~1000, $C_3^-/C_2^-$ feed = 6 bar. pentamethyl heptane 120 mL, reaction temperature 40° C., reaction time 20 min.
[b] TiBA-pacified 10-undecen-1-ol comonomer solution (TiBA:10-undecen-1-ol = 1:1; 1.0M).
[c] The yield was obtained under non-optimized conditions and was determined using the weight of polymer obtained after filtration and drying in vacuum oven overnight at 60° C.
[d] To determine the percentage of functionalization and ethylene content, a fraction of the product was dispersed in toluene (100 mL) containing glacial acetic acid 10 v % and hydrochloric acid (5M, 2.5 v %) and heated until a clear solution was obtained. The resulting mixture was cooled down and precipitated in an excess iPrOH, filtered, washed with demineralized water, dried at 60° C. in vacuo overnight and analysed by NMR.

The invention claimed is:

1. A process for the manufacture of an ethylene and propylene ionomer comprising the steps of:
   a1) copolymerizing ethylene, propylene and at least one masked functionalized olefin monomer in the presence of a catalyst system,
   wherein the at least one masked functionalized olefin monomer is a reaction product of a functionalized olefin monomer represented by the structure according to Formula (I) and a masking agent:

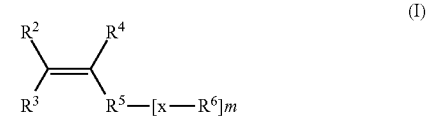

wherein $R^2$, $R^3$, and $R^4$ are each independently selected from the group consisting of H and hydrocarbyl with 1 to 16 carbon atoms, wherein $R^5$—$[X-(R^6)_n]_m$ is a polar functional group containing one or multiple heteroatom containing functionalities $X-(R^6)_n$ wherein X is selected from —O—, —S— or —CO$_2$— and $R^6$ is H, and n is 1, or X is N and $R^6$ is each independently selected from the group consisting of H and a hydrocarbyl group with 1 to 16 carbon atoms, and n is 2, wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H and hydrocarbyl with 1 to 16 carbon atoms and $R^5$ comprises 1 to 10 carbon atoms, wherein $R^3$ and $R^5$ may together form a ring structure that is functionalized with one or multiple $X-(R^6)_n$, where X is attached to either a main chain or side chain of $R^5$, where m is an entire number between 1 and 10, and either b1) treating a product of step a1) with a protic solution containing a metal salt, an ammonium salt or an amine to perform an exchange reaction, or a2) contacting a product of step a1) with a Brønsted acid solution to abstract a residue derived from the masking agent from the product of step a1) to obtain a functionalized ethylene and propylene copolymer, and either b2) treating a product of step a2) with a monovalent metal salt, a monocationic ammonium salt or a monofunctional amine, or b3) treating a product of step a2) with a multi-valent metal salt, a polycationic ammonium salt or a polyfunctional amine.

2. The process of claim 1, wherein in step a1) an ethylene to propylene weight ratio is from 20:80 to 70:30.

3. The process of claim 1, wherein the functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid and 10-undecenoic acid.

4. The process of claim 1, wherein an amount of the at least one masked functionalized olefin monomer in step a1) is 0.01 to 30 mol %, with respect to a total molar amount of ethylene, propylene and the at least one masked functionalized olefin monomer.

5. The process of claim 1, wherein the masking agent is selected from trialkyl aluminum complexes, dialkyl magnesium complexes, dialkyl zinc complexes or trialkyl boron complexes.

6. The process of claim 1, wherein in step b1) or b2) the metal salt or monovalent metal salt is a fluoride, chloride, bromide, iodide, hydroxide, nitrite, nitrate, formate, acetate, bicarbonate, carbonate, sulfite, sulfate, chlorate, perchlorate, bromate or EDTA salt of a metal selected from one or more of lithium, sodium, potassium or silver.

7. The process according to claim 1, wherein in b3) the multi-valent metal salt is a fluoride, chloride, bromide, iodide, hydroxide, nitrite, nitrate, formate, acetate, bicarbonate, carbonate, sulfite, sulfate, chlorate, perchlorate, bromate or EDTA salt of magnesium, calcium, strontium, barium, zinc, copper, tin, silver, iron, chromium, aluminum or gallium.

8. The process of claim 1, wherein, the Brønsted acid solution used in step a2) comprises inorganic and/or organic acids.

9. An ethylene and propylene ionomer obtained by the process of claim 1.

10. The ethylene and propylene ionomer of claim 9 wherein, an ethylene to propylene weight ratio in the ethylene and propylene ionomer is from 20:80 to 70:30, and said functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid and 10-undecenoic acid, wherein functionalized groups in the ethylene and propylene ionomer are cross-linked by means of one or more selected from the group consisting of monovalent metal ions, monocationic ammonium ions, monofunctional amines, multi-valent metal ions, polycationic ammonium ions and polyfunctional amines.

11. The ethylene and propylene ionomer of claim 9 comprising between 0.1 and 10 molar equivalent, of a metal salt, an ammonium salt or an amine with respect to a mol % of the functionalized olefin monomer incorporated in the ethylene and propylene ionomer.

12. The ethylene and propylene ionomer of claim 9, wherein a content of functionalized olefin monomer is between 0.01 and 30 mol %, with respect to a total of ethylene, propylene and the functionalized olefin monomer in the ethylene and propylene ionomer.

13. The ethylene and propylene ionomer according to claim 9 comprising between 0.1 and 100 mol equivalent, of a metal salt, an ammonium salt or an amine with respect to a mol % of functionalized olefin monomer incorporated in the ethylene and propylene ionomer.

14. The ethylene and propylene ionomer according to claim 9 comprising at least one or two types of reversible cross-links.

15. The process according to claim 1, wherein the functionalized olefin monomer is 3-buten-1-ol, 3-buten-2-ol, 10-undecene-1-ol, 4-pentenoic acid, or 10-undecenoic acid.

16. The process according to claim 1, wherein the monofunctional amine is NH$_3$, Me$_2$NH, NMe$_3$, EtNH$_2$, Et$_3$N, or BuNH$_2$.

17. The process according to claim 1, wherein the ammonium salt is a fluoride, chloride, bromide, iodide, hydroxide, nitrite, nitrate, formate, acetate, bicarbonate, carbonate, sulfite, sulfate, chlorate, perchlorate or bromate salt of NH$_4^+$, Et$_3$NH$^+$, or Bu$_4$N$^+$.

18. The process according to claim 1, wherein the polyfunctional amine is selected from ethylene diamine, N,N,N',N'-tetramethyl ethylene diamine, 1,3-diaminopropane, hexamethylenediamine, piperazine, diethylene triamine, N,N,N',N'',N''-pentamethyl diethylene triamine, or polyethylenimine.

* * * * *